US000001932H

(19) United States

(12) Statutory Invention Registration (10) Reg. No.: US H1932 H

Heathman et al. (43) Published: Jan. 2, 2001

(54) WETTABILITY AND FLUID DISPLACEMENT IN A WELL

(75) Inventors: James F. Heathman, Katy, TX (US); J. Michael Wilson; James H. Cantrell, both of Duncan, OK (US)

(73) Assignee: Halliburton Energy Services, Inc., Duncan, OK (US)

(21) Appl. No.: 09/281,719

(22) Filed: Mar. 30, 1999

(51) Int. Cl.[7] ..... E21B 47/00

(52) U.S. Cl. ..... 166/250.14; 166/292

(56) References Cited

U.S. PATENT DOCUMENTS

| | | | |
|---|---|---|---|
| 3,286,510 | 11/1966 | Parker | 73/53 |
| 3,289,467 | 12/1966 | Parker et al. | 73/61.4 |
| 4,259,868 | 4/1981 | Rao et al. | 73/597 |
| 4,380,266 | 4/1983 | Wellington | 166/252 |
| 4,409,662 | 10/1983 | Rao | 364/364 |
| 4,430,889 | 2/1984 | Sutton | 73/61.4 |
| 4,528,842 | 7/1985 | Brown | 73/61.4 |
| 4,567,765 | 2/1986 | Rao et al. | 73/594 |
| 4,648,264 | 3/1987 | Freese et al. | 73/64.1 |
| 4,691,558 | 9/1987 | Vinson et al. | 73/64.1 |
| 4,700,567 | 10/1987 | Frey et al. | 73/151 |
| 4,823,594 | 4/1989 | Gray | 73/54 |
| 4,873,648 | 10/1989 | Mouser et al. | 73/61.1 R |
| 5,325,723 | 7/1994 | Meadows et al. | 73/794 |
| 5,329,811 | 7/1994 | Schultz et al. | 73/155 |

FOREIGN PATENT DOCUMENTS

| | | | |
|---|---|---|---|
| 2 017 916 | 10/1979 | (GB) | G01B 17/02 |

OTHER PUBLICATIONS

SPE Paper 17240 entitled "Innovative Devices For Testing Drilling Muds" by Marlo Zamora et al.

SPE Paper 20438 entitled "The Use of Filtration Theory In Developing A Mechanism for Filter–Cake Deposition By Drilling Fluids In Laminar Flow" by J.V. Fisk et al.

SPE Paper 20439 entitled "Dynamic and Static Filtrator–Loss Techniques for Monitoring Filter–Cake Quality Improves Drilling–Fluid Performance" by B.G. Chesser et al.

*Primary Examiner*—Harold J. Tudor

(74) *Attorney, Agent, or Firm*—Craig W. Roddy; E. Harrison Gilbert, III

(57) ABSTRACT

An inverter fluid that intermixes with a non-aqueous (e.g., oil) external/aqueous internal fluid to cause external/internal inversion is designed. This includes testing a selected inverter fluid with a test fluid having a composition nominally equivalent to the composition of the non-aqueous external/aqueous internal fluid. A quantity of the designed inverter fluid is made and placed in the annulus of a well, such as an oil or gas well, to remove the non-aqueous external/aqueous internal fluid on at least a portion of one or more surfaces of the annulus. This can include pumping the inverter fluid along with a stream of cement. The inverter fluid displaces at least part of the non-aqueous external/aqueous internal fluid in the annular region and inverts the coating of non-aqueous external/aqueous internal fluid sufficient to remove the coating ahead of the cement. Determining a suitable inverter fluid comprises: measuring a parameter related to electrical conductivity of an initial mixture including (1) a test fluid having a composition nominally equivalent to the non-aqueous external/aqueous internal fluid and (2) part of a selected inverter fluid; and adding a further part of the selected inverter fluid to the initial mixture until the measured parameter indicates the external/internal phases of the test fluid have inverted.

16 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

WETTABILITY AND FLUID DISPLACEMENT IN A WELL

BACKGROUND OF THE INVENTION

This invention relates generally to displacing fluids and water-wetting surfaces within a well, such as an oil or gas well. In one specific example, the present invention facilitates proper bonding of cement to side surfaces of an annulus in the well in which the cement is placed. This includes determining suitable displacement fluids that sufficiently wet the sides of the annulus to enable proper cement bonding. The present invention has applicability other than cementing, but in such other applications it still pertains to wettability and determining compositions for achieving suitable water-wetting within an oil or gas well.

In one manner of drilling a well, "drilling mud" is pumped into a rotated drill string to which a drill bit is attached. The mud typically exits through openings in the drill bit to lubricate the bit and to carry cuttings up an annulus between the drill string and the wellbore for disposal at the surface. One type of drilling mud is an emulsion of substances which define a non-aqueous external phase and an aqueous internal phase. In this drilling mud a non-aqueous "oleaginous" external phase (e.g., oil or synthetic polymers) is used to inhibit swelling of water-sensitive drill cuttings (e.g., shale). It is known in the art that typical oil based drilling fluids contain some amount of an internal aqueous phase. Typically, an aqueous (water based) internal phase comprised of salts such as calcium chloride is used to prepare the emulsion structure, imparting viscous properties to the drilling fluid. Additionally, a composition of these oil or synthetic-based drilling fluids typically includes chemical emulsifying agents which act to form the oleaginous-external phase emulsions, also known as "invert" emulsions. These agents also promote oil-wet surfaces. This oil-wetted state promotes lubrication of the drilling bit and further stabilization of formation materials. Such a drilling fluid can be made as known in the art.

After drilling is completed, the drill string or some other string of tubular members is typically cemented in the wellbore as part of completing the well. One type of cementing operation includes pumping cement down through the string and out into the annulus to displace the drilling mud from the annulus to the surface (however, flow in the opposite direction can occur in some operations, such as in reverse circulating or reverse cementing). A successful cementing operation also includes bonding the cement with the outer surface of the string and the inner surface of the wellbore defining the annulus.

Bonding of the cement to the tubular string or to the wellbore surface can be less than desirable if the string and wellbore surfaces are not conducive to cement bonding. Of particular relevance to the present invention, coatings from the non-aqueous portion of the drilling fluid can interfere with the bonding because the aqueous cement does not readily bond with the non-aqueous substances of the drilling mud. If improper bonding occurs at either of these surfaces, a thin region called a "micro-annulus" can occur. Formation of a micro-annulus can lead to undesirable fluid migration outside the wellbore casing, thus losing zonal isolation of the wellbore. Further, casing lifetime may be compromised if migrating fluids are corrosive.

To promote proper bonding, an important aspect of oil or gas well cementing is the proper displacement of the drilling fluid from the annular space between the formation and casing or between inner casing and larger outer casing in such a fashion that the formation or casing surfaces may form hydraulic bonds with the cementing slurry. This bond forms best when these surfaces are water-wet. Thus, the displacing fluid must act as an inverter fluid but must also leave the formation or casing surfaces in a water-wet state.

A displacing fluid can be pumped ahead of the cement to create water-wet surfaces. Such fluids include spacers or preflushes, for example. The types of such fluids relevant to the present invention are those which are intended to cause the coatings of non-aqueous (hereafter "oleaginous") external/aqueous internal drilling muds to invert so that the aqueous phase inverts with the oleaginous phase whereby the aqueous substance is external. These include the primary fluid itself, such as a cement slurry having suitable surfactants. Fluids which cause this inversion are referred to in this description and in the claims as "inverter fluids." Typically such inverter fluids are used as a displacement or displacing fluid.

Such inverter fluids are also used to displace oleaginous external/aqueous internal fluids from cased hole or open-hole wellbores in operations other than cementing. One example is to replace these fluids with a completion fluid such as a solution of calcium chloride or bromide. This operation is conducted to clean the wellbore for further operation, such as perforation of the casing or in the case of open hole, production of the well. In this case, the inverter fluid serves to displace the previous fluid and leave the formation surfaces in a water-wet state.

Although inverter fluids and their use in cementing and other operations of a well are known, there is the need for a method by which specific effective inverter fluid compositions can be readily determined for specific drilling muds (or other downhole fluids). There are also the needs for related methods of water-wetting an annulus in a well and, specifically of preparing a well for a cementing operation and also of cementing the well.

SUMMARY OF THE INVENTION

The present invention meets the above-noted needs by providing a novel and improved method related to wettability and fluid displacement in a well. Particular aspects of the invention include a method of water-wetting an annulus in a well for cementing, wherein at least a portion of one or more surfaces of the annulus has an oleaginous external/aqueous internal fluid on it ("oleaginous" is the term used in this description and the claims to encompass the materials that can make up the non-aqueous phase of the compositions to which the present invention pertains; examples include natural oil and synthetic polymers used in these compositions). Another aspect includes a method of cementing a well in which a tubular string is disposed with an annular region adjacent the outer surface of the tubular string, at least part of the annular region having an oleaginous external/aqueous internal fluid. A further aspect of the present invention is a method of determining an inverter fluid to use for inverting a composition of an oleaginous external/aqueous internal fluid in a well.

In specific implementations, this invention is particularly applicable to wettability evaluation of spacers or preflushes suitable to water-wet downhole surfaces to which cement is expected to bond during a well cementing operation performed after the well has been drilled using oil or synthetic-based drilling fluids, for example. The present invention can improve the effectiveness of a cementing job in a well while making economical and efficient use of materials used in the job. In general, the present invention provides a convenient means of evaluating new materials for the purposes of inverting oleaginous external phase drilling fluids and imparting water-wetting of the downhole surfaces.

The method of water-wetting an annulus in a well, wherein at least a portion of one or more surfaces of the annulus has an oleaginous external/aqueous internal fluid on it, comprises designing an inverter fluid that intermixes with the oleaginous external/aqueous internal fluid to cause the oleaginous external/aqueous internal fluid to invert; this includes testing a selected inverter fluid with a test fluid having a composition nominally equivalent to the composition of the oleaginous external/aqueous internal fluid. This method also comprises making a quantity of the designed inverter fluid to be placed in the annulus of the well. The method also includes placing the quantity of inverter fluid in the well for inverting the oleaginous external/aqueous internal fluid on at least a portion of one or more surfaces of the annulus.

The present invention also provides a method of cementing a well in which a tubular string is disposed. Adjacent the outer surface of the tubular string is an annular region. At least part of the annular region has an oleaginous external/aqueous internal fluid. This method of the invention comprises designing an inverter fluid that intermixes with the oleaginous external/aqueous internal fluid to remove at least a coating of the oleaginous external/aqueous internal fluid on the outer surface of the tubular string. This designing includes testing a selected inverter fluid with a test fluid having a composition nominally equivalent to the composition of the oleaginous external/aqueous internal fluid. This method further comprises making a quantity of the designed inverter fluid to be placed in the annulus of the well, and pumping the quantity of inverter fluid in the well along with a stream of cement. The inverter fluid leads the stream of cement such that the pumped inverter fluid displaces at least part of the oleaginous external/aqueous internal fluid in the annular region and inverts the coating of oleaginous external/aqueous internal fluid sufficient to remove the coating ahead of the cement. At least part of the pumped inverter fluid is subsequently displaced by the pumped stream of cement.

The method of the present invention for determining an inverter fluid to use for inverting a composition of an oleaginous external/aqueous internal fluid in a well comprises measuring a parameter related to the electrical conductivity of an initial mixture including (1) a test fluid having a composition nominally equivalent to the oleaginous external/aqueous internal fluid and (2) part of a selected inverter fluid. This method also comprises adding a further part of the selected inverter fluid to the initial mixture until the measured parameter indicates the test fluid has inverted from an oleaginous external/aqueous internal state to an aqueous external/oleaginous internal state. This method can further comprise making the initial mixture by mixing the test fluid and a spacer fluid as the selected inverter fluid; and in this method, adding a further part of the selected inverter fluid includes titrating a selected surfactant in the initial mixture. In another embodiment, this method can further comprise making the initial mixture by mixing the test fluid, and a spacer fluid/surfactant composition as the selected inverter fluid, in a selected ratio; and in this implementation, adding a further part of the selected inverter fluid includes titrating additional spacer fluid/surfactant composition in the initial mixture.

Therefore, from the foregoing, it is a general object of the present invention to provide a novel and improved method related to wettability and fluid displacement in a well. Other and further objects, features and advantages of the present invention will be readily apparent to those skilled in the art when the following description of the preferred embodiments is read in conjunction with the accompanying drawings.

BRIEF DESCRIPTION OF THE DRAWINGS

FIG. 6 is a schematic circuit diagram of a particular implementation of a circuit for testing fluid in accordance with the present invention.

DETAILED DESCRIPTION OF THE INVENTION

The present invention will be described with reference to cementing an oil or gas well after the well has been drilled in a conventional manner. The drilling process uses an oleaginous external/aqueous internal fluid. One example of such a fluid is an oil external/water internal drilling mud emulsion designed and made as known in the art. An example of a specific drilling fluid includes:

| Composition | Weight of Composition in Grams |
|---|---|
| oleaginous fluid | 148 |
| $Ca(OH)_2$ (lime) | 3.5 |
| organophilile clay | 4 |
| emulsifier | 8 |
| wetting agent | 4 |
| 25% $CaCl_2$ brine | 106 |
| barite | 247 |

Figure 1:
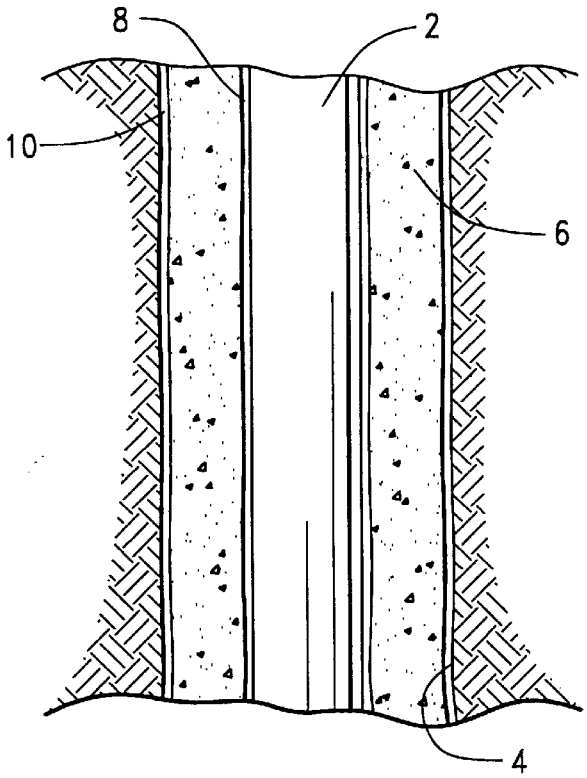
FIG. 1 is a sectioned elevational representation of part of a wellbore having a tubular string cemented in it.

Referring to FIG. 1, a tubular string 2 (e.g., a drill string, production tubing string, casing or liner) is shown after it has been cemented into a suitably drilled wellbore 4. Cement 6 is placed in known manner (e.g., by pumping) in the annulus defined between the outer surface of the tubular string 2 and the surface of the cut wellbore 4.

Also represented in FIG. 1 is a thin layer 8 between the tubular string 2 and the inner surface of the column of cement 6. This does not necessarily extend along the entire length of the tubular string 2 or column of cement 6, but it is shown in FIG. 1 to illustrate what is referred to as a micro-annulus made of, typically, a coating of the drilling mud or other fluid previously in the well before displacement by the cement 6.

If the layer 8 is not suitably removed and the surfaces of the annulus left water-wet, the cement 6 may not properly bond through it to the tubular string 2. Such inadequate bonding can have the shortcomings referred to above. It is a purpose of the present invention to ensure that this layer is sufficiently removed and the surfaces water-wetted that desired bonding occurs. A micro-annulus 10 can also form between the cement 6 and the wellbore 4; the present invention can also effectively treat this situation.

To prevent or reduce the opportunity for micro-annulus formation, the present invention provides for water-wetting the annulus in the well. As mentioned above, at least a portion of one or more surfaces of the annulus has an oleaginous external/aqueous internal fluid on it as a result of the drilling process; and the present method can treat this fluid to thereby prepare the annulus, such as to enable cement pumped into the annulus to properly bond to the tubular string 2 and the wellbore 4, for example.

This method of the present invention comprises designing an inverter fluid that intermixes with the oleaginous external/aqueous internal fluid to cause the oleaginous external/aqueous internal fluid (or at least a coating of this fluid on the outer surface of the tubular string or on the wall of the wellbore) to invert. Designing the inverter fluid includes testing a selected inverter fluid with a test fluid having a composition nominally equivalent to the composition of the oleaginous external/aqueous internal fluid. "Nominally equivalent" as used in this description and in the claims means that the test fluid has the same recipe as the oleaginous external/aqueous internal fluid used during the drilling procedure, and the test fluid preferably is also heated to a comparable temperature to which the actual downhole fluid is exposed. The test fluid is only thus "nominally" equivalent since it might not also include any other variations that occur in the actual drilling fluid placed downhole (but "nominally equivalent" also encompasses exact identity between the fluids as well).

Once the desired inverter fluid has been designed, the method further includes making a quantity of the designed inverter fluid to be placed in the annulus of the well. This quantity is placed in the well for inverting the oleaginous external/aqueous internal fluid actually in the well on at least a portion of one or more surfaces of the annulus. One technique for placing the inverter fluid includes pumping the quantity of inverter fluid in the well along with a stream of cement such that the present invention also encompasses a method of cementing a well in addition to merely water-wetting the well. In this application, the inverter fluid leads the stream of cement such that the pumped inverter fluid displaces at least part of the oleaginous external/aqueous internal fluid in the annular region and inverts the coating of oleaginous external/aqueous internal fluid sufficient to remove the coating ahead of the cement. At least part of the pumped inverter fluid is subsequently displaced by the pumped stream of cement to obtain the bulk cement displacement illustrated in FIG. 1, but without an undesirable micro-annulus. Pumping of the fluids is performed in a conventional or otherwise known manner (such as reverse circulating or cementing, for example).

Another technique for placing the inverter fluid includes pumping the quantity of inverter fluid in the well followed by a quantity of a completion fluid such as a calcium chloride brine. In this technique, displacing and inverting with the inverter fluid and ultimately replacing of the oil external fluid and the inverter fluid with the completion fluid prepares the wellbore for future operations.

The testing and the making steps referred to above can be performed at the well or elsewhere (e.g., at a laboratory for the former and a manufacturing facility for the latter). The testing is in accordance with further aspects of the present invention described below. Making the designed inverter fluid is performed in a conventional manner given a particular design obtained from the testing of the present invention. For example, the aqueous inverter fluid is generally prepared at the well site. Mixing water is measured into a field blender. Defoaming agents are added, followed by a pre-blended dry material comprised of viscosifying agents and selected clays. Barite or other weighting agents are added to adjust the specific gravity of the inverter fluid to a value usually slightly greater than that of the drilling fluid. Selected surface active agents (surfactants) are added in sufficient quantity to perform the tasks of inverting the oil-based fluid and leaving wellbore surfaces in a water-wet condition.

The process of testing in accordance with the present invention leads to a determination of a particular inverter fluid that can be used for inverting the particular test composition of oleaginous external/aqueous internal fluid against which the inverter fluid is tested. In the particular application of displacing and inverting a drilling fluid emulsion in an oil or gas well at the leading end of a stream of cement being pumped into the well, the inverter fluid to be determined is typically in the class of fluids referred to as spacers. Such spacers are typically combined with one or more surfactants to make up the complete inverter fluid. Thus, a particular application of the present invention seeks to determine a particular spacer/surfactant inverter fluid best suited for inverting the particular drilling fluid with which the test was conducted. This inverter fluid is used both to separate the leading end of the pumped stream of cement (or other well treating fluid) from the drilling fluid already in the well and to displace and invert the drilling fluid so that its aqueous internal phase becomes the external phase. The inverter fluid can also clean filter cake from the tubular string 2 or the wellbore 4.

The method of the present invention for determining such an inverter fluid comprises measuring a parameter related to the electrical conductivity of an initial mixture of (1) a test fluid having a composition nominally equivalent to the oleaginous external/aqueous internal fluid in the well and (2) part of a selected inverter fluid. The test method also comprises adding a further part of the selected inverter fluid to the initial mixture until the measured parameter indicates the test fluid has inverted from an oleaginous external/aqueous internal state to an aqueous external/oleaginous internal state. This will be further described with reference to FIGS. 2–7 and a spacer/surfactant inverter fluid for use with an oil external/water internal drilling fluid. Such an inverter fluid typically comprises a base aqueous fluid, a viscosity and fluid loss control additive, weighting material agent and a surfactant. The weighting material is included in the spacer fluid to increase its density for well control and increases the buoyancy effect of the spacer fluid on the gelled drilling fluid and filter cake adhered to the walls of the wellbore. Viscosity additives are intended to produce rheological properties which provide suspended particle stability and fluid loss control to the spacer fluid. When a surfactant is included in the spacer fluid, it is intended to enhance the chemical compatibility of the spacer fluid with the other fluids and to water-wet downhole surfaces for an improved cement bond and better removal of wellbore solids. However, the present invention pertains to any inverter fluid within the context as described herein, including surfactants in cement slurries.

Normally, oil-external drilling fluids are not electrically conductive and water-based spacers are conductive. The specific conductivity depends on the particular chemistry of the fluid.

Figure 2:
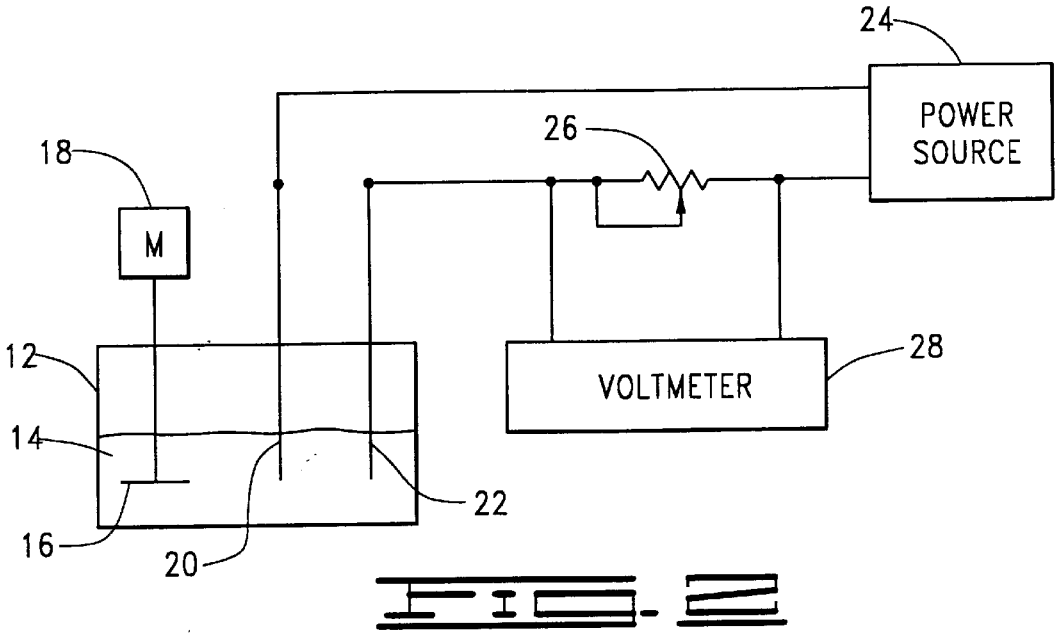
FIG. 2 is a schematic and block diagram of a circuit for testing fluid in accordance with the present invention.

Referring to FIG. 2, the fluid whose electrical conductivity is tested is placed in a container 12. The fluid is identified by the reference numeral 14. A paddle 16 is disposed in the fluid 14. The paddle 16 can be rotated by an electric motor 18.

Two electrodes 20, 22 are immersed in the fluid 14 and connected to respective portions of the remaining electrical circuit shown in FIG. 2. The electrode 20 connects to one terminal of a power source 24, and the electrode 22 connects to a potentiometer 26 that is connected to another terminal of the power source 24. A voltmeter 28 is connected across the potentiometer 26 to read a voltage across the potentiometer 26 in response to the conductivity of current through the fluid 14 from one electrode to the other.

Figure 3:
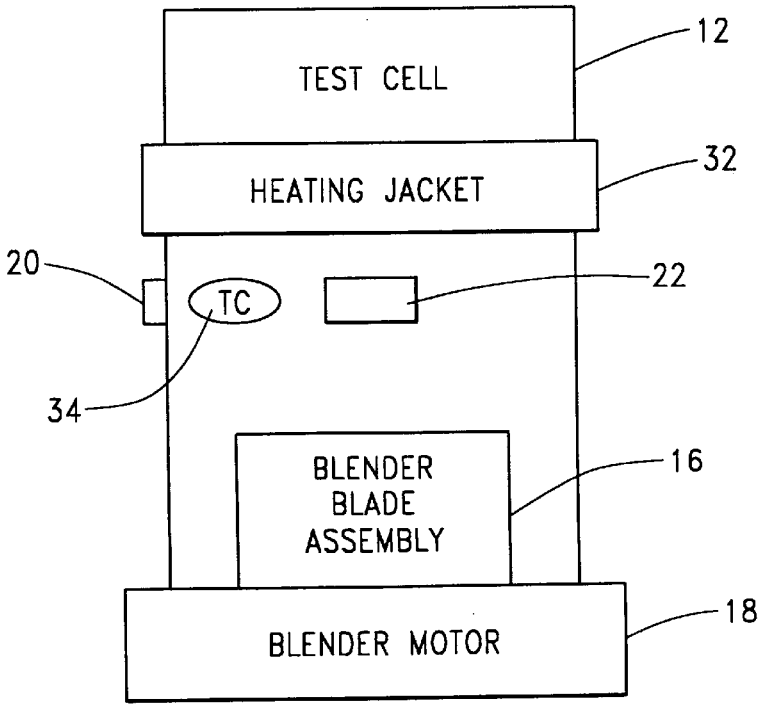
FIG. 3 is a representation of a preferred embodiment of a test device for testing fluid in accordance with the present invention.
Figure 4:
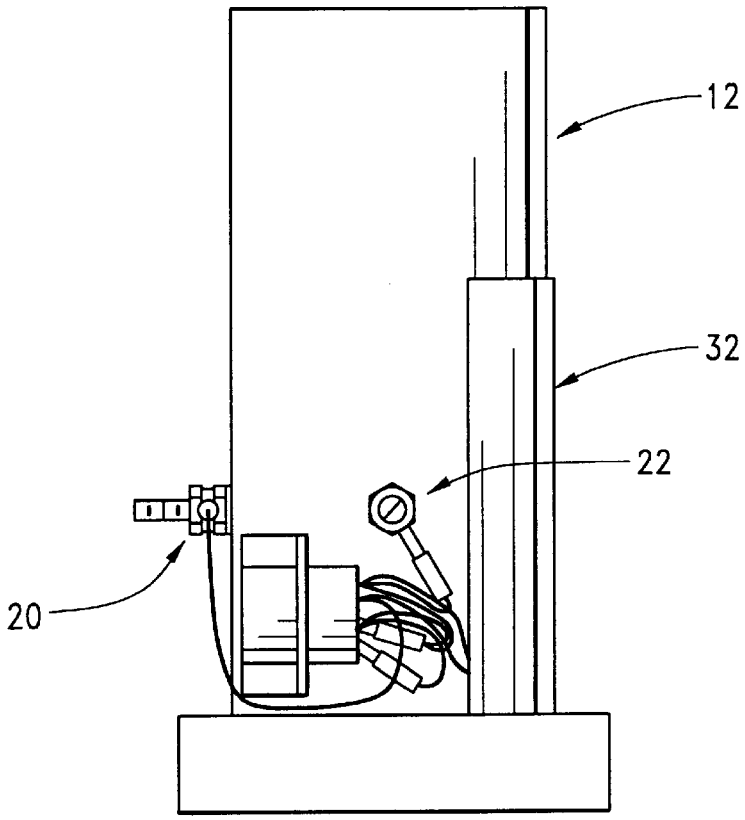
FIG. 4 is an elevational view of a particular implementation of the preferred embodiment test device of FIG. 3.
Figure 5:
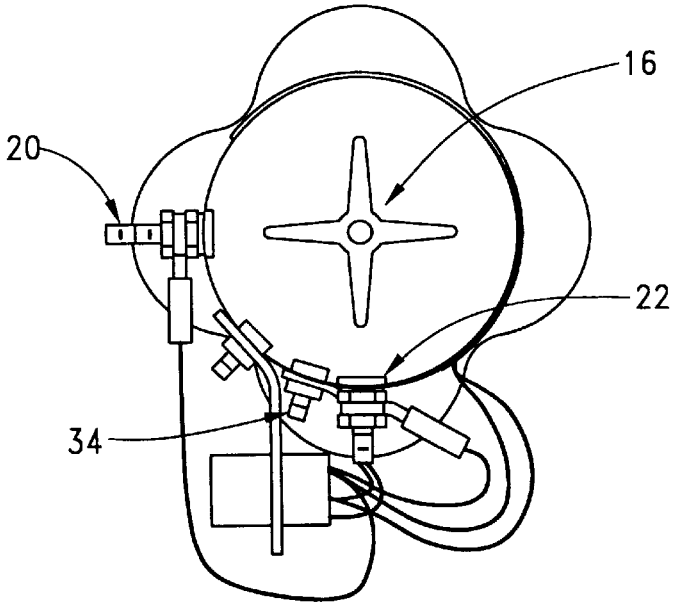
FIG. 5 is a top view of the particular implementation of FIG. 4.
Figure 3:
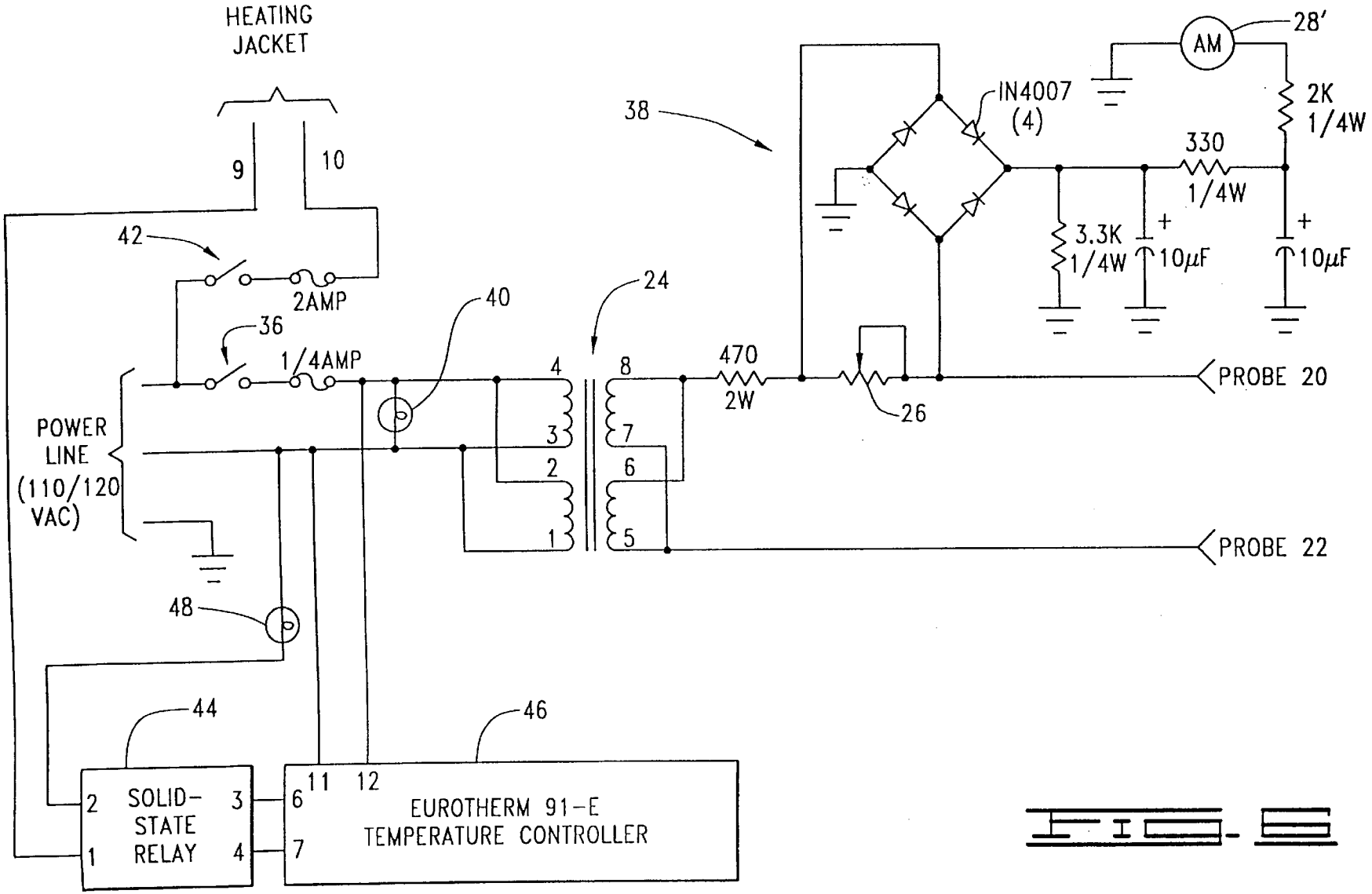

A general representation of a particular test device is shown in FIG. 3, but an actual implementation of a test device and its circuit is illustrated in FIGS. 4–6. In FIGS. 4 and 5, a Waring blender (or other suitable device such as a Chandler API mixer) motor 18 drives a Waring blender blade assembly 16 inside the test cell 12 having an external heating jacket 32 and a thermocouple 34, which are used to maintain a constant temperature in the test cell since the conductivity measurement is temperature dependent. Electrodes 20, 22 are mounted through, and insulated from electrical contact with, the side wall of the test cell 12 and are spaced circumferentially (e.g., 90°, but other spacings can be used). The electrodes 20, 22 can be made of any suitable conductive metals. Examples include iron, brass, nickel or stainless steel. Size of the electrode surface is not critical but preferably is about 0.2 square inches.

Referring to FIG. 6, one type of power source 24 is a 24-Vac source such as a STANCOR P8616 transformer from Newark Electronics. A 24-Vac source is preferred for safety purposes, but other alternating current power sources can be used. Direct current sources can also be used, but they are not preferred because electrophoretic mobility of ionic species can cause plating at the electrodes, resulting in loss of signal. The transformer 24 is energized through an on/off switch 36 connectible to a suitable primary power supply (e.g., a conventional power main).

The potentiometer 26, such as a Bourns 3500S-2-102, sets the span of readings described below. In the circuit of FIG. 6, an ammeter 28' (e.g., Monnteck 25-DUA-200-U from Allied) is used instead of a voltmeter but to same effect as the voltage across the potentiometer 26 is rectified and conditioned by the components 38 connected to the ammeter 28.

Also shown in FIG. 6 is an on/off indicating lamp 40 that illuminates when the switch 36 is closed to place the circuit in an operative state for testing in accordance with the present invention.

A heating jacket control circuit is also shown in FIG. 6. A heating control switch 42 is used to control a temperature controller 46 that in turn operates a solid-state relay 44 which causes the heating jacket 32 to be energized or not. A lamp 48 illuminates when the heating jacket 32 is energized (i.e., is providing heat).

The apparatus shown in FIGS. 2–6 measure the surface-acting properties of the fluid 14 by measuring the voltage drop across the potentiometer 26 (measured either directly as a voltage in FIG. 2 or as a resulting current in FIG. 6). With a coating of a stable, oil-external drilling fluid on the electrodes, the voltage drop is zero because no or undetectable current flows between electrodes 20, 22. The maximum voltage drop, which is obtained when using a conductive spacer by itself as the fluid 14, will be some value above zero; that value can be set by adjusting the potentiometer 26. Once the zero and maximum span values are determined using suitable calibrating fluids, the point at which external phase change or inversion of the actual mud to be tested occurs (thus wettability) can be determined.

During an actual test, the reading from the meter 28/28' will, at some point as surfactant inverter fluid volumes increase, start to increase as the surfactants begin to invert the oil-external drilling mud and clean the surfaces of the electrodes. During this transition process, the meter readings can fluctuate, dropping to a stable minimum value at equilibrium when the mixture homogenizes and the oil recoats the electrodes. Eventually, the voltage drop across/current flow through the potentiometer 26 will reach a maximum value equal to or slightly greater than that recorded for 100 percent spacer as the fluid 14, thus indicating the electrodes are completely water-wetted and the mixture is 100 percent water-external.

The following is a particular procedure for determining a spacer/surfactant inverter fluid relative to a test fluid comprising an oil external/water internal drilling fluid emulsion.

The test fluid is selected based on the particular drilling fluid used or to be used in a well. As mentioned above, the test fluid is nominally equivalent to the actual fluid used or intended to be used in the well (if the test is performed at the well site, it can even be a sample of a batch of the drilling mud to be pumped into the well).

The initial spacer and surfactant compositions to be tested against the test oleaginous external/aqueous internal fluid are chosen by experience in dealing with the spacer fluids as known by one skilled in the art.

The various selected fluids to be used in the test are preconditioned by heating them to a temperature corresponding to a temperature in the well in which the determined inverter fluid is to be used. Typically this will be the particular well's bottom hole circulating temperature. Such heating ensures the fluids are stable and all chemicals have been conditioned. Conditioning can occur using conventional high temperature, high pressure equipment if necessary.

Before a test is run, the voltage or current relative to the potentiometer 26 is measured using the meter 28/28' and only the oil external/water internal drilling fluid used as the fluid 14. This reading should be zero since the fluid should be nonconductive. A non-zero reading indicates the instrument is malfunctioning (e.g., a short occurring through the instrument or the electrodes) or the oil-based fluid is contaminated with water in the external phase.

Additionally, the electrical parameter (voltage or current) is measured with only the spacer fluid as the fluid 14. This should give a non-zero reading through the meter 28/28' because the aqueous spacer fluid is electrically conductive. The potentiometer 26 can be adjusted until a desired maximum reading is obtained. The potentiometer 26 should not be adjusted after this setting is obtained.

The testing of the inverter fluid relative to the test fluid preferably is carried out using a heated dynamic bath. That is, an initial mixture of the total volume of the selected test fluid (the oil external/water internal drilling mud in the example) and part of at least the selected spacer to be tested preferably is heated and stirred. Conventional heated mud cups may not be large enough for a stirring device such as the paddle 16 and the electrodes 20, 22. A 500-milliliter beaker in a double boiler placed on a hot plate can be sufficient for a particular implementation. Glass is not advisable due to the possibility of breakage. Should a metal container be used, the electrodes 20, 22 cannot be allowed to contact the metallic walls because contacting the walls can result in erroneous operation. A plastic-walled beaker capable of being placed directly on a hot plate can be used (e.g., Nalge, Teflon PFA Beaker, Catalog #1550-1000). Referring to FIGS. 4 and 5 described above, a preferred embodiment includes a stainless steel test cell with insulated electrodes and a silicone encased heating jacket.

The stirring rate achieved using the motor 18 and the paddle 16 should be sufficient to quickly homogenize the test fluid, partial inverter fluid and any added substances but not so high that excessive shear causes air-entrainment, which may affect readings and surfactant performance.

To perform the actual testing of the combination of spacer/surfactant inverter fluid and oil external/water internal drilling emulsion after the span calibration described above has been accomplished, one or both of two procedures can be used. The particular one(s) chosen can be based upon prior knowledge of the mud system, spacer and surfactant behavior. During this procedure, viscosity spikes that may occur at specific mud-to-spacer and mud-to-surfactant ratios can also be observed and reported.

In one procedure, the drilling fluid to be tested and the selected spacer (but not surfactant) are mixed in a desired ratio (e.g., 50:50). After the mixture is made homogenous by mixing with the paddle 16 and while the mixture is continuing to be stirred, one or more selected surfactants are titrated into this embodiment of the fluid 14 and the electrical behavior is observed through the response of the meter 28/28'. When the maximum reading corresponding to the reading obtained with only the spacer fluid is reached, this indicates the mixture is fully water external and thus the drilling mud has been inverted. The maximum reading may be slightly above that obtained with 100 percent spacer (e.g., due to salts dissolved in the aqueous phase of the mud). To ensure that inversion has actually occurred, the maximum reading should remain stable for a suitable length of time, such as twenty minutes. If the reading decreases, the appropriate surfactant(s) should again be added and the electrical response monitored until an electrically stable fluid is obtained. Once the electrically stable fluid has been obtained, one can determine the concentration of the titrated inverter fluid ingredient(s) (i.e., the one or more surfactants in the example) in the total mixture in the test container 12. This total mixture includes the measured initial mixture plus the measured added part of the inverter fluid. The concentration of the added ingredients in just the total inverter fluid itself can also be readily determined (i.e., this concentration is readily determined because the volume of spacer in the initial mixture is known and the volume of added surfactant is known from the titration).

The other procedure that can be used is to initially prepare the spacer with the one or more surfactants to be used. Instead of titrating surfactant into the initial mixture, the composite spacer/surfactant inverter fluid is titrated into the mud to determine the spacer volume required to cause inversion. Again, the reading on the meter 28/28' is observed and when the maximum reading is obtained for the suitable time period, the electrically stable fluid has been obtained and one then knows the ratio of the inverter fluid to the drilling mud via the titration process. That is, the total volume of the selected inverter fluid in the initial mixture (if any) and the added further part of the lo selected inverter fluid are known or determined and the ratio of the final volume of the inverter fluid to the initial volume of the test fluid in the initial mixture can be determined.

Depending on the viscosity profile of the mud, spacer and mixtures thereof, it may be desirable to adjust the surfactant such that the inversion from oil external to water external occurs at some specified mud-to-spacer ratio. For example, synthetic muds typically have a low yield point; therefore, when the phase change occurs, the now water-wetted solids of the mud may settle severely. This can lead to bridging in downhole casing tools and in the annulus when fluid velocities are insufficient to provide support. This can also lead to annular solids bed deposition on the low side of an inclined or horizontal wellbore.

Conversely, some mud systems viscosify severely when inverted, especially in the presence of an aqueous spacer. Depending on where the viscosity peak occurs, it may be desirable to shift the mud-to-spacer ratio such that inversion occurs away from the viscosity peak by adjusting the surfactant. The titration procedure wherein one or more surfactants are titrated (rather than the entire inverter fluid) is best suited to pinpointing the critical surfactant concentration. Once that surfactant concentration is known, the inverter fluid titration procedure can be repeatedly used with alternate surfactant concentrations to find a mud-to-spacer ratio where inversion occurs but with a lower viscosity spike.

Figure 7:
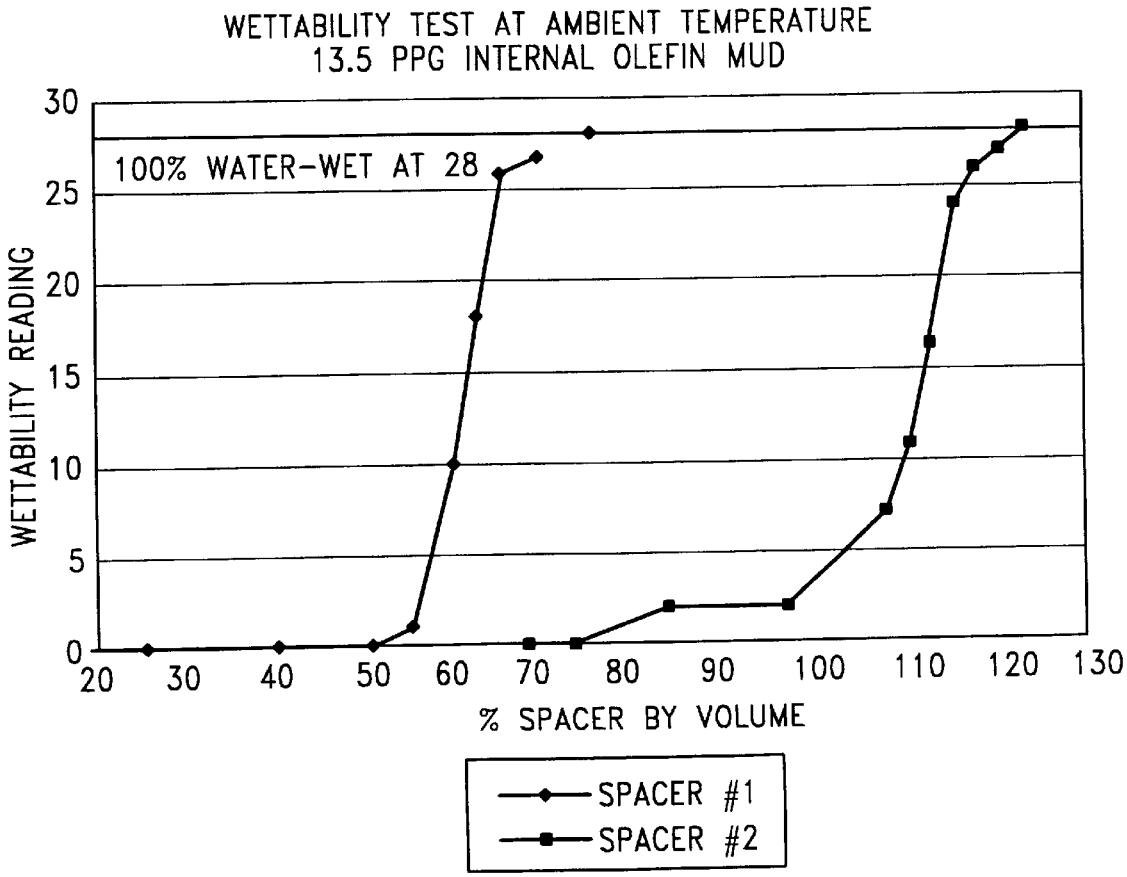
FIG. 7 is a graph of wettability versus percentage of spacer by volume for two particular spacers used in examples for explaining aspects of the present invention.

The graph in FIG. 7 shows examples of two different inverter fluids which provide different solids-carrying capability. A properly designed spacer should have adequate Theological properties to support solids released from the mud system. In the case of a mud system that loses solids-carrying capacity when it is inverted, it may be more desirable to adjust (typically reduce) the surfactant loading such that a higher percentage of spacer is required to cause the external phase of the resulting mixture to become water-wet. This will result in more solids-carrying capacity, thus reducing the risk of dropping solids as described above. In the graphs of FIG. 7, spacer no. 2 has half the surfactant volume of spacer no. 1; therefore, more inverter fluid is needed to obtain comparable wettability readings to spacer No. 1 (in FIG. 7, the percent spacer by volume refers to the ratio of the inverter fluid to the volume of drilling mud tested—i.e., percent by volume of mud). Spacer no. 1 is an inverter fluid containing 13.5 pounds per gallon TUNED SPACER material plus 1.2 gallons per barrel each of CLEANBORE A surfactant, SEM-7 surfactant, and AS-5 anti-sludging. Spacer no. 2 is an inverter fluid containing 13.5 pounds per gallon TUNED SPACER material plus 0.6 gallon per barrel each of CLEANBORE A surfactant, SEM-7 surfactant, and AS-5 anti-sludging. These substances are from Halliburton Energy Services, Duncan, Okla.

The present invention does not relate to compatibility issues between the inverter fluid and the external/internal phase fluid, but it is assumed that such Theological compatibility is an inherent part of achieving a safe phase change to an aqueous-external fluid system, with such compatibility being known in the art.

Thus, the present invention is well adapted to carry out the objects and attain the ends and advantages mentioned above as well as those inherent therein. While preferred embodiments of the invention have been described for the purpose of this disclosure, changes in the construction and arrangement of parts and the performance of steps can be made by those skilled in the art, which changes are encompassed within the spirit of this invention as defined by the appended claims.

What is claimed is:

1. A method of water-wetting an annulus in a well, wherein at least a portion of one or more surfaces of the annulus has an oleaginous external/aqueous internal fluid on it, comprising:

designing an inverter fluid that intermixes with the oleaginous external/aqueous internal fluid to cause the oleaginous external/aqueous internal fluid to invert, including testing a selected inverter fluid with a test fluid having a composition nominally equivalent to the composition of the oleaginous external/aqueous internal fluid;

making a quantity of the designed inverter fluid to be placed in the annulus of the well; and placing the quantity of inverter fluid in the well for inverting the oleaginous external/aqueous internal fluid on at least a portion of one or more surfaces of the annulus.

2. A method as defined in claim 1, wherein the testing and the making are performed at the well.

3. A method as defined in claim 1, wherein the testing includes:

measuring a parameter related to the electrical conductivity of an initial mixture comprising the test fluid and part of the selected inverter fluid; and adding a further part of the selected inverter fluid to the initial mixture until the measured parameter indicates the test fluid has inverted from an oleaginous external/aqueous internal state to an aqueous external/oleaginous internal state.

4. A method of cementing a well in which a tubular string is disposed with an annular region adjacent the outer surface of the tubular string, at least part of the annular region having an oleaginous external/aqueous internal fluid, the method comprising:

designing an inverter fluid that intermixes with the oleaginous external/aqueous internal fluid to remove at least a coating of the oleaginous external/aqueous internal fluid on the outer surface of the tubular string, including testing a selected inverter fluid with a test fluid having a composition nominally equivalent to the composition of the oleaginous external/aqueous internal fluid;

making a quantity of the designed inverter fluid to be placed in the annulus of the well; and pumping the quantity of inverter fluid in the well along with a stream of cement, wherein the quantity of inverter fluid leads the stream of cement such that the pumped inverter fluid displaces at least part of the oleaginous external/aqueous internal fluid in the annular region and inverts the coating of oleaginous external/aqueous internal fluid sufficient to remove the coating ahead of the cement, at least part of which pumped inverter fluid is subsequently displaced by the pumped stream of cement.

5. A method as defined in claim 4, wherein the testing and the making are performed at the well.

6. A method as defined in claim 4, wherein the testing includes:

measuring a parameter related to the electrical conductivity of an initial mixture comprising the test fluid and part of a selected inverter fluid; and adding a further part of the selected inverter fluid to the initial mixture until the measured parameter indicates the test fluid has inverted from an oleaginous external/aqueous internal state to an aqueous external/oleaginous internal state.

7. A method of determining an inverter fluid to use for inverting a composition of an oleaginous external/aqueous internal fluid in a well, the method comprising:

measuring a parameter related to the electrical conductivity of an initial mixture including (1) a test fluid having a composition nominally equivalent to the oleaginous external/aqueous internal fluid and (2) part of a selected inverter fluid; and adding a further part of the selected inverter fluid to the initial mixture until the measured parameter indicates the test fluid has inverted from an oleaginous external/aqueous internal state to an aqueous external/oleaginous internal state.

8. A method as defined in claim 7, further comprising determining a concentration of an inverter fluid ingredient used in the added further part relative to the total of selected inverter fluid in the initial mixture and added further part of the selected inverter fluid.

9. A method as defined in claim 7, further comprising determining the total volume of the selected inverter fluid in the initial mixture and the added further part of the selected inverter fluid and determining the ratio of the determined total volume to the volume of test fluid in the initial mixture.

10. A method as defined in claim 7, wherein:

the method further comprises making the initial mixture, including mixing the test fluid and a spacer fluid as the selected inverter fluid; and adding a further part of the selected inverter fluid includes titrating a selected surfactant in the initial mixture.

11. A method as defined in claim 7, wherein:

the method further comprises making the initial mixture, including mixing the test fluid, and a spacer fluid/surfactant composition as the selected inverter fluid, in a selected ratio; and adding a further part of the selected inverter fluid includes titrating additional spacer fluid/surfactant composition in the initial mixture.

12. A method as defined in claim 7, further comprising:

heating the test fluid and the inverter fluid to a temperature corresponding to a temperature in the well in which the determined inverter fluid is to be used; and heating and stirring the initial mixture during the measuring and adding steps.

13. A method as defined in claim 12, further comprising determining a concentration of an inverter fluid ingredient used in the added further part relative to the total of selected inverter fluid in the initial mixture and added further part of the selected inverter fluid.

14. A method as defined in claim 12, further comprising determining the total volume of the selected inverter fluid in the initial mixture and the added further part of the selected inverter fluid and determining the ratio of the determined total volume to the volume of test fluid in the initial mixture.

15. A method as defined in claim 12, wherein:

the method further comprises making the initial mixture, including mixing the test fluid and a spacer fluid as the selected inverter fluid; and adding a further part of the selected inverter fluid includes titrating a selected surfactant in the initial mixture.

16. A method as defined in claim 12, wherein:

the method further comprises making the initial mixture, including mixing the test fluid, and a spacer fluid/surfactant composition as the selected inverter fluid, in a selected ratio; and adding a further part of the selected inverter fluid includes titrating additional spacer fluid/surfactant composition in the initial mixture.

* * * * *